United States Patent [19]

Kübler

[11] 4,349,903
[45] Sep. 14, 1982

[54] SWITCHING OF CHANNELS BETWEEN TWO PREMODULATION SYSTEMS

[75] Inventor: Ulrich Kübler, Backnang, Fed. Rep. of Germany

[73] Assignee: Licentia Patent-Verwaltungs-G.m.b.H., Frankfurt am Main, Fed. Rep. of Germany

[21] Appl. No.: 116,812

[22] Filed: Jan. 30, 1980

[30] Foreign Application Priority Data

Feb. 2, 1979 [DE] Fed. Rep. of Germany ....... 2903943

[51] Int. Cl.³ .......................... H04J 1/04; H04Q 11/02
[52] U.S. Cl. ...................................... 370/57; 370/69.1
[58] Field of Search ...................... 370/57, 69, 74, 76, 370/30

[56] References Cited

U.S. PATENT DOCUMENTS

| 2,994,047 | 7/1961 | Börner | 333/71 |
| 3,495,188 | 2/1970 | Kopp | 370/69 |
| 3,577,180 | 5/1971 | Albsmeier | 333/72 |
| 3,992,589 | 11/1976 | Kuegler | 370/69 |

FOREIGN PATENT DOCUMENTS 1922550 12/1974 Fed. Rep. of Germany.
2449808 4/1976 Fed. Rep. of Germany.

OTHER PUBLICATIONS

Das Kanalumsetzergestell, Schwertzel et al., Technische Mitteilungen AEG-Telefunken 1977.
Linear Integrated Circuits Data Book, 3rd Edition, 1973 8-417 to 8-425.

Primary Examiner—Douglas W. Olms
Attorney, Agent, or Firm—Spencer & Kaye

[57] ABSTRACT

In the transmission of information in first and second carrier frequency systems occupying the same frequency bands and each composed of a succession of channel carriers having different respective frequencies, each channel carrier defining a respective transmission channel and being modulated with a premodulation carrier itself modulated with information to be transmitted in its associated channel, at least one channel of the first system is switched into a selected channel of the second system by shifting the frequency of the modulated channel carrier of the one channel of the first system with the aid of an unmodulated channel carrier, filtering the channel to be switched through out of the shifted signal by means of a bypass filter, and converting the filtered-out channel to the frequency of the selected channel of the second system with the aid of a carrier at the frequency of a selected channel carrier of the first system.

6 Claims, 9 Drawing Figures

SWITCHING OF CHANNELS BETWEEN TWO PREMODULATION SYSTEMS

BACKGROUND OF THE INVENTION

The present invention relates to a procedure for switching through individual channels or a plurality of adjacent channels between two carrier frequency systems whose transmission bands have the same frequency position and are formed according to the premodulation principle, but whose premodulation frequency positions are different.

A method for switching through between two premodulation systems is described in German Offenlegungsschrift [Laid-open Application] No. 2,449,808. An example is disclosed therein which relates to switching through between two systems in which the premodulation channel of each system lies below the transmission band. The same method can of course also be used for systems whose premodulation channels lie above the transmission band.

The methods disclosed there cannot be used without difficulty under the circumstances described above.

SUMMARY OF THE INVENTION

It is therefore an object of the present invention to switch through individual channels or groups of channels between two carrier frequency systems whose basic primary groups, or transmission bands, are formed according to the premodulation principle, but whose premodulation channels have different relative frequency positions, e.g. in one system below the transmission band and in the other system above the transmission band.

This and other objects are accomplished, according to the invention, by converting the transmission frequency band of the first system with the aid of a channel carrier, filtering out the band to be switched through by means of a bandpass filter, and converting this filtered-out band with the aid of a channel carrier of the first system into the transmission band of the second system.

DESCRIPTION OF THE PREFERRED EMBODIMENTS

Figure 1:
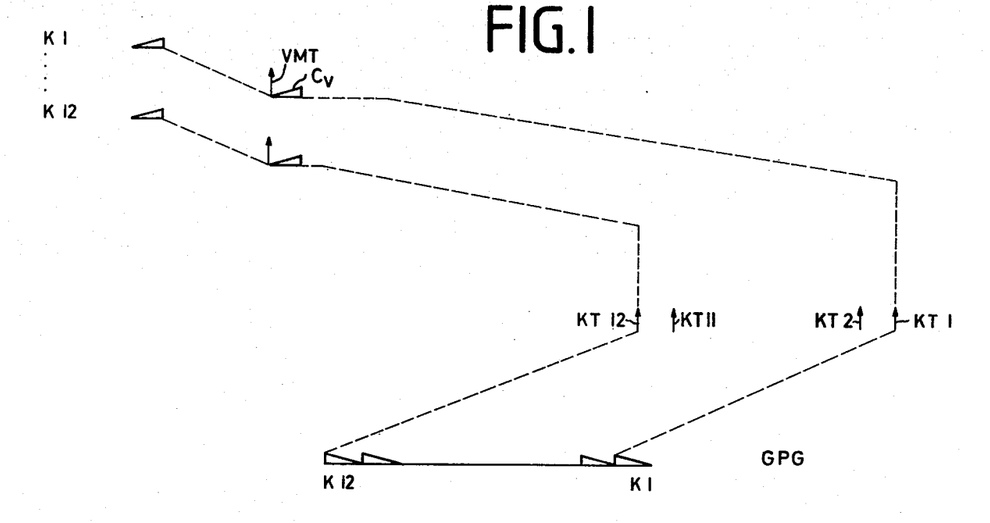
FIGS. 1 and 2 are schematic signal conversion diagrams, whose abscissus represent frequency, illustrating two different carrier frequency systems between which switching can be effected according to the invention.

FIG. 1 shows how, in a known manner, by conversion with a premodulation carrier VMT and further conversion with channel carriers KT1, KT2 ... KT11 and KT12 having respectively different frequencies higher than that of VMT, a basic primary group, or transmission band, GPG is formed from original channels K1 ... K12. The frequency of the premodulation carrier VMT and thus also of the associated premodulation channel $C_v$ are here lower than the frequency of the transmission band GPG.

As is depicted in FIG. 1, band GPG is formed by modulating a premodulation carrier VMT with each channel K1 to K12 individually and then modulating each channel carrier KT1 to KT12 with a respective premodulation channel $C_v$ and deriving the frequency difference component to form a respective location, or channel, of band GPG.

Figure 2:
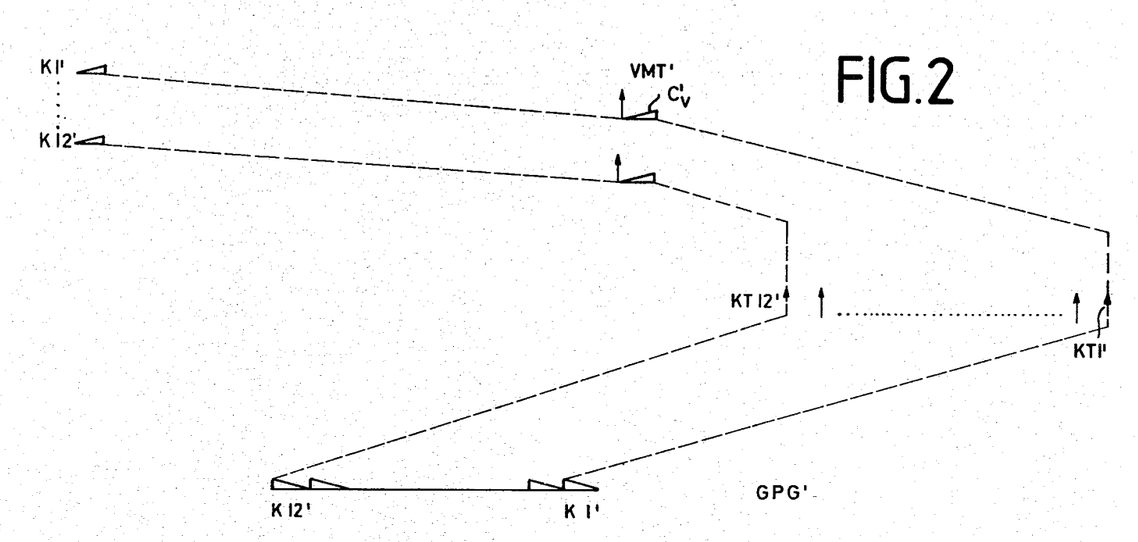

In FIG. 2 it is shown how, likewise in a known manner, a basic primary group GPG' is obtained where the frequency of the premodulation carrier VMT, and thus also the frequency of the associated premodulation channel $C_v$, are higher than that of the transmission band GPG'.

Figure 3:
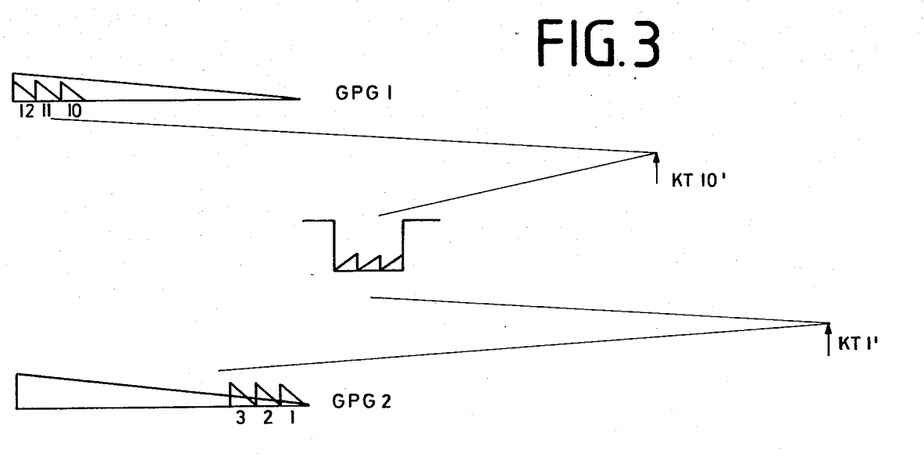
FIGS. 3 and 4 are schematic signal conversion diagrams, whose abscissus represent frequency, illustrating switching procedures according to the invention.
Figure 4:
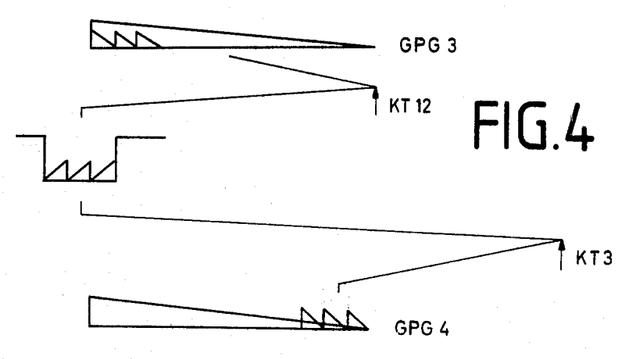

FIGS. 3 and 4 show, by way of examples, how according to the present invention switching through takes place between two such systems.

First, examples of possible carrier frequencies will be given for two different systems.

(1) The carrier frequencies of a premodulation system with premodulation channel frequency above the transmission band frequency, as shown in FIG. 2, are assumed to be, for example:

| | |
|---|---|
| premodulation frequency VMT' | = 128 KHz |
| channel carrier frequencies KT1' | = 236 KHz |
| KT2' | = 232 KHz |
| KT3' | = 228 KHz |
| . | |
| . | |
| KT12' | = 192 KHz |

(2) The carrier freqencies of a premodulation system with premodulation channel frequency below the transmission band frequency, as shown in FIG. 1, are assumed to be, for example:

| | |
|---|---|
| premodulation frequency VMT | = 48 KHz |
| channel carrier frequencies KT1 | = 156 KHz |
| KT2 | = 152 KHz |
| KT3 | = 148 KHz |
| . | |
| . | |
| KT12 | = 112 KHz |

In FIG. 3, the basic primary group of a first system is marked GPG1 and locations 10, 11 and 12 thereof are shown. The premodulation channel frequency of this system lies above that of the basic primary group GPG1 and a second basic primary group GPG2 to a second system whose premodulation channel frequency lies below the frequency of that basic primary group.

The transmission band GPG1 in the first system is brought, by modulation, onto a channel carrier of the first system, e.g. KT10'=200 KHZ, into a frequency position which includes the premodulation channel $C'_v$ for the first system and is then converted by modulation with a further channel carrier KT1'=236 KHZ, also of the first system, to the basic primary group GPG2 occupying the same frequency band position as group GPG1. The result in this example is then that the channels which in the incoming band GPG 1 lie at locations 10, 11 and 12 finally come to lie at locations 1, 2 and 3 of the ongoing band GPG2.

The carrier frequency KT1′=236 KHz, which actually is not present in the second system, can be obtained, in the second system, from the carrier frequencies VMT=48 KHz and KT2=156 KHz. By dividing the frequency 48 KHz by the factor 3, multiplying the thus obtained frequency of 16 KHz by the factor 5 and mixing the resulting frequency of 80 KHz with one of the carriers KT1 . . . 12, respectively, e.g. the carrier KT2=156 KHz, the corresponding carrier KT1′ . . . 12′ e.g. KT1′=236 KHz, results.

FIG. 4 shows the switching through between a first system, or transmission band, GPG3 whose premodulation channel has a frequency above the transmission band GPG3 and a second system, or transmission band, GPG4 whose premodulation channel frequency lies below that band GPG4. The transmission band GPG3 in the first system is brought into a frequency position, with the aid of a channel carrier of the second system, e.g. KT12=112 KHz, which includes the premodulation channel $C_y$ of the second system, and is then converted with a channel carrier of the second system, e.g. KT3=148 KHz back to the basic primary group, or transmission band, frequency position.

The carrier frequency of 112 KHz which in the first system is actually not present, can be obtained from the carrier frequencies VMT′=128 KHz and KT12′=192 KHz. By dividing the frequency 128 KHz by the factor of 32, multiplying the thus obtained frequency of 4 KHz by the factor 20 and mixing the resulting frequency of b 80 KHz with a carrier KT1′ . . . 12′, e.g. KT12′=192 KHz, there results the corresponding carrier KT1 . . . 12, e.g. KT12=112 KHz.

The example of FIG. 4 shows that the present invention is applicable for switching premodulation systems having a high prechannel position through to those having a low prechannel position as well as vice versa.

Figure 5:
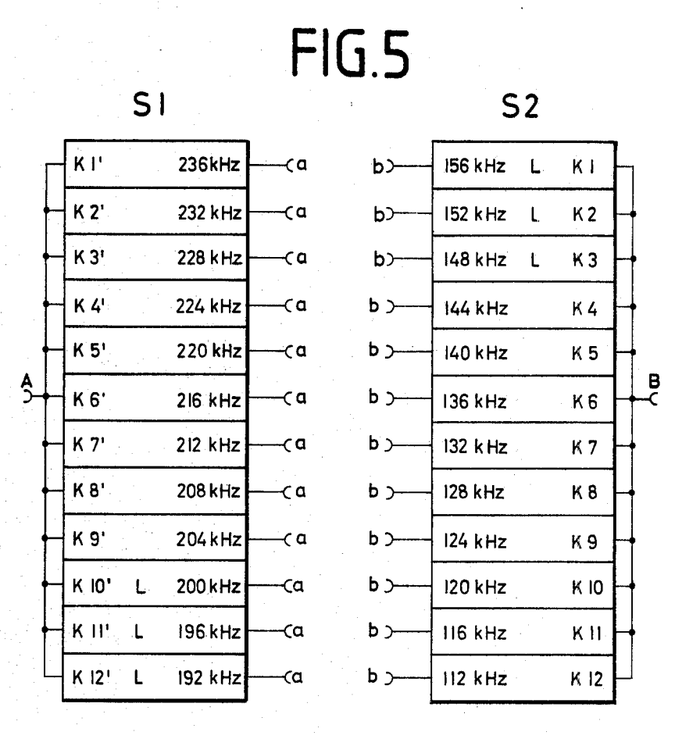
FIG. 5 is a block circuit diagram of two arrangements constructed to form basic primary groups or transmission bands formed according to the premodulation principle (Prior Art).

FIG. 5 is a schematic representation of a structure for forming two such systems composed of two structural parts S1 and S2 each associated with a respective system and each having 12 partial units which each receive the premodulation carrier belonging to the associated system and a respective channel carrier frequency. The above mentioned frequencies VMT and KT1 . . . KT12 or VMT′ and KT1′ . . . KT12 are indicated as exemplary values.

Figures 6, 7:
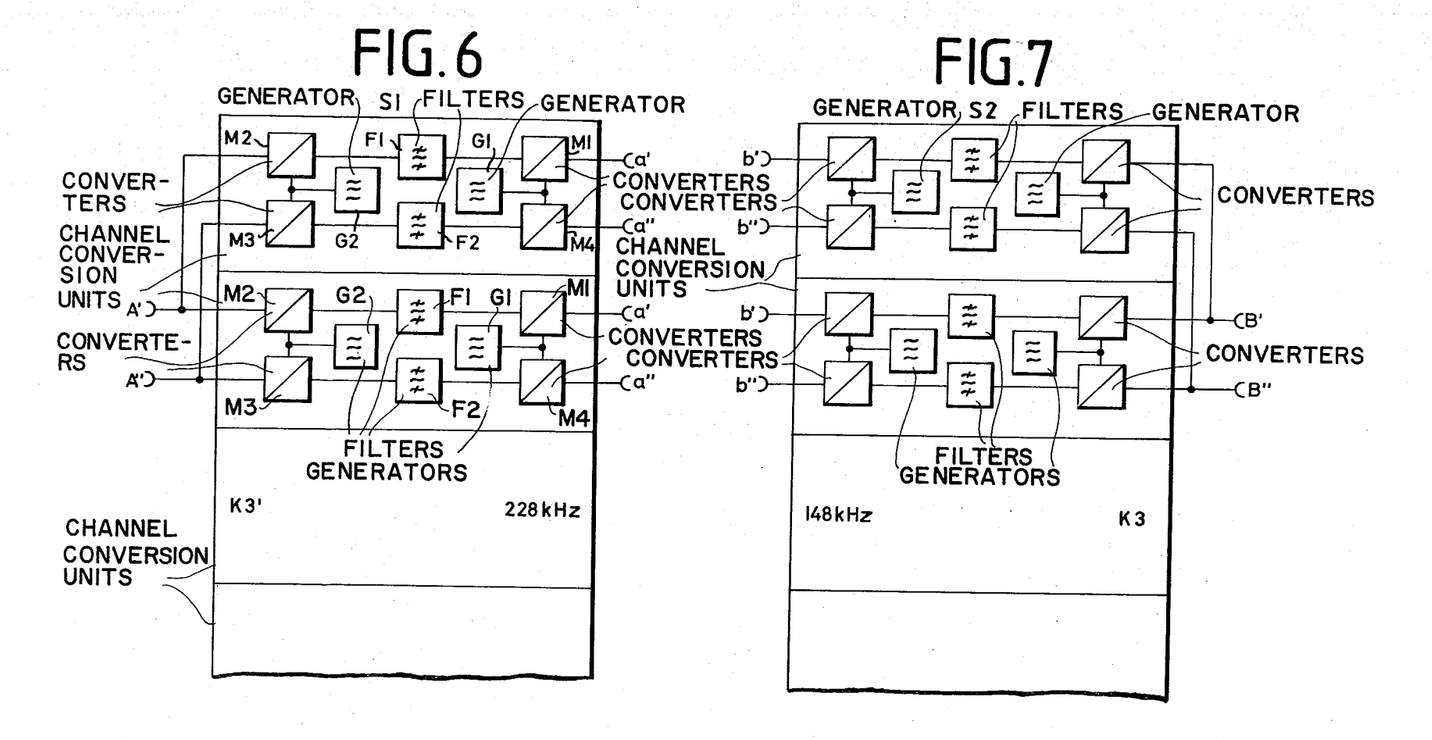
FIGS. 6 and 7 show details of the block circuits S1 and S2 respectively in FIG. 5 (Prior Art).

Each of the partial units of the two arrangements shown in FIG. 5 includes for the transmitting direction a converter for the channel band, a premodulation filter, and a converter for the premodulation band, and for the receiving direction a converter for the transmission band, a premodulation filter and a converter for the premodulation band. This is shown in FIGS. 6 and 7.

In the transmitting direction a channel band (0 . . . 4 KHz), which lies at the two-wire junction point a′ is converted by the converter M1 into the premodulation band (128–132 KHz) with the aid of the generator G1 (128 KHz), filtered out by the premodulation filter F1 (128 . . . 132 KHz) and the premodulation band is converted by the converter M2 into the transmission band 60–108 KHz (104 . . . 108 KHz) with the aid of the generator G2 (236 KHz).

In the receiving direction the transmission band 60 . . . 108 KHz at the two-wire junction point A″, is converted with the converter M3 into a frequency band including the premodulation band with the aid of the generator G2 (236 KHz), the premodulation band is filtered out by F2 and converted by the converter M4 into the channel band (0 . . . 4 KHz).

At the input of the four wire junction point A of the structural part S1, associated with the first system, a transmission band of 60 . . . 108 KHz is received. Each channel thereof, which has a bandwidth of 4 KHz, is first brought to the premodulation frequency range of 128 KHz . . . 132 KHz by means of the respective channel carrier frequencies KT12′=192 KHz . . . KT1′=236 KHz and is then mixed with the premodulation carrier VMT′=128 KHz to provide at each output of the four-wire junction points a the respective channel information signal in the basic low frequency range of 0-4 KHz.

At the inputs of the fourwire junction points b of the structural part S2 associated with the second system different channels are present in the low frequency range of 0-4 KHz, and these are first brought to the premodulation frequency range 48 . . . 52 KHz by the premodulation carrier VMT=48 and are then transposed by the channel carrier KT 12=112 KHz . . . KT1=156 KHz of the second system to the second system transmission band of 60 . . . 108 KHz, which can be obtained at output of the fourwire junction point B.

Figure 8:
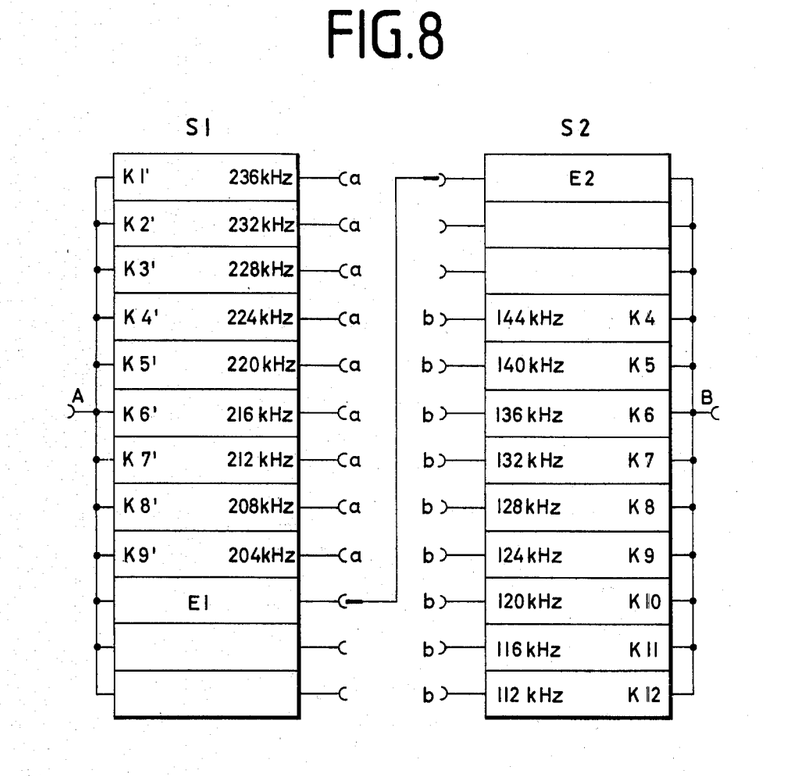
FIG. 8 is a block circuit diagram of an arrangement constructed to effect switching in accordance with the invention.
Figure 9:
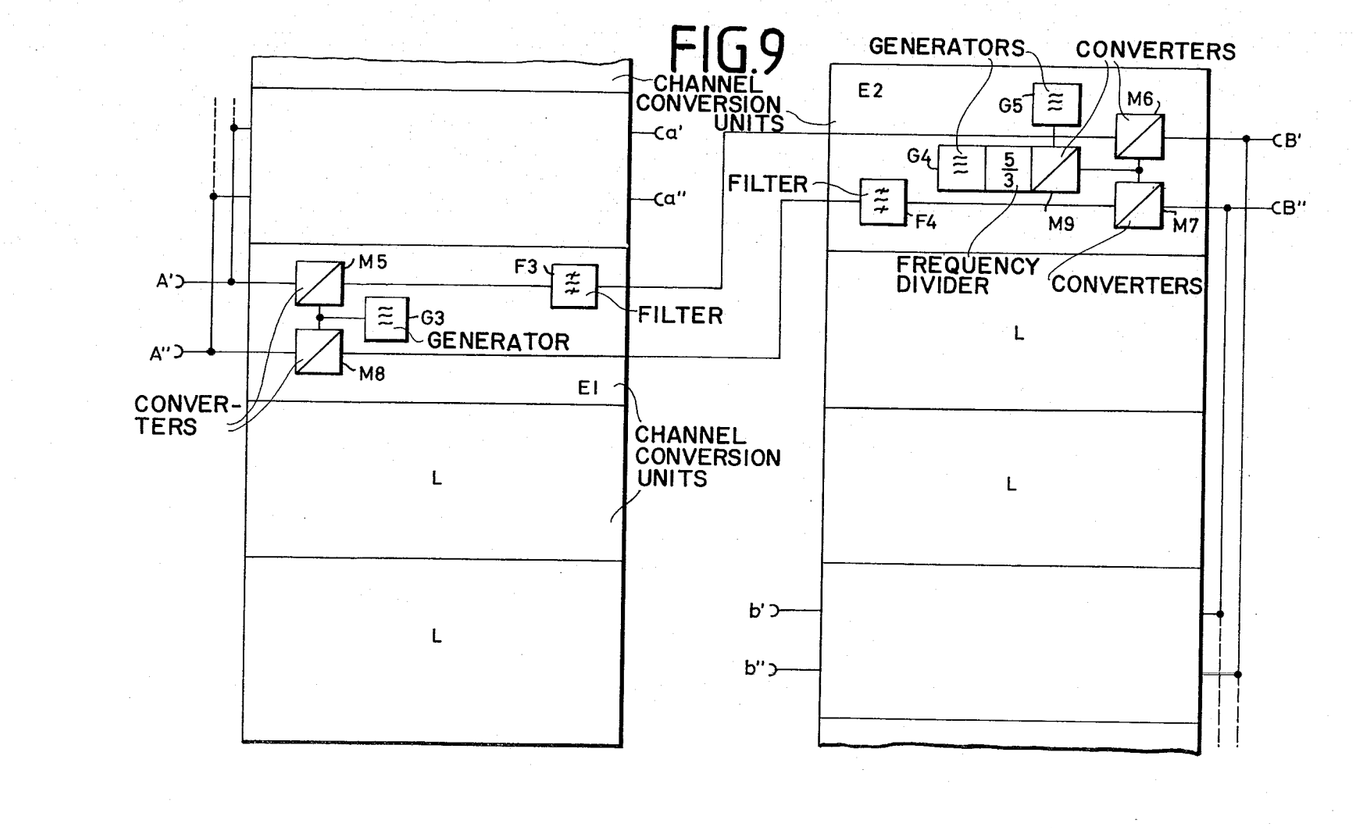
FIG. 9 shows a more detailed block circuit diagram of parts of FIG. 8.

If now, as described above in connection with FIG. 3, the channels K10′, K11′ and K12′ of the structural part S1 are to be brought through to the channels K1, K2, K3 of the structural part S2, the present invention provides that the channel conversion units K10′, K11′, K12′, K1, K2 and K3 are removed (indicated by L in FIG. 5 and the units K10′ and K1 are replaced by other units (indicated by E1 and E2, respectively, E2 in FIG. 8) which, as shown in FIG. 9 according to the description of FIG. 3, include converters for the transmission band (M5, M7), bandpass filters (F3, F4) and converters for the switchthrough band (M6, M8), the substitute unit of this example also including, instead of K1, the carrier generation (performed by devices G4, G5, M9) described in connection with FIG. 3.

The above mentioned carrier frequencies generation is described in

"Das Kanalumsetzergestell 7R" by Heinrich Schwertzel and Ulrich Kuebler in Technische Mitteilungen AEG-Telefunken Beiheft: "Analoge Übertragungseinrichtungen 1977," Elitera-Verlag, Berlin, p. 38, [FIG. 8].

As converters can be used such as described in

"Linear Integrated Circuits Data Book" Third Edition, Motorola Semiconductor Products Inc., Nov. 1973 p. 8-416 to 8-425.

Premodulation filters as F1, F2 and bandpass filters as F3 and F4 are shown in

German Patent DE-PS No. 19 22 550

U.S. Pat. No. 3,577,180 and

U.S. Pat. No. 2,994,047.

Of course, all other conceivable switch-throughs between the two systems are possible within the scope of the present invention. The example of FIG. 5 shows how advantageously switching through between two premodulation systems having different prechannel positions can be accomplished according to the present invention, mainly for switching through a plurality of channels, because only two carrier frequencies are required which are available anyhow or can be easily obtained from available frequencies and rearrangement is limited to installing a single line between the two systems.

It will be understood that the above description of the present invention is susceptible to various modifications, changes and adaptations, and the same are intended to be comprehended within the meaning and range of equivalents of the appended claims.

What is claimed is:

1. In the transmission of information in first and second carrier frequency systems occupying the same frequency bands and each composed of a succession of channel carriers having different respective frequencies, each channel carrier defining a respective transmission channel and being modulated with information to be transmitted in its associated channel, by the steps of providing a respective premodulation carrier for each system, causing the information to be transmitted in each channel to premodulate the premodulation carrier of its associated system, and modulating each channel carrier with the premodulation carrier modulated with the information to be transmitted in its associated channel, the premodulation carriers for the two systems having respectively different frequency positions relative to the frequency band of the two systems, the improvement comprising a method for switching at least one channel of the first system into a selected channel of the second system by the steps of: shifting the frequency of the modulated channel carrier of the one channel of the first system with the aid of an unmodulated channel carrier; filtering the channel to be switched through out of the shifted signal by means of a bandpass filter; and converting the filtered-out channel to the frequency of the selected channel of the second system with the aid of a carrier at the frequency of a selected channel carrier of the first system.

2. Method as defined in claim 1 comprising transmitting the selected channel carrier of the first system to the second system over a separate line.

3. Method as defined in claim 1 comprising generating the carrier at the frequency of the selected channel carrier of the first system in the second system.

4. Method as defined in claim 3 wherein said step of generating comprises deriving the carrier at the frequency of the selected channel carrier of the first system from carriers present in the second system.

5. Method as defined in claim 4 wherein the carrier at the frequency of the channel carrier of the first system is derived from the premodulation carrier and a channel carrier of the second system.

6. A method as defined in claim 5 wherein said step of generating is carried out in a unit of the second system composed of a mixer stage, a converter and a bandpass filter.

* * * * *